No. 615,421. Patented Dec. 6, 1898.
A. F. & A. G. BEYER.
APPARATUS FOR MOLDING SOAP OR OTHER MATERIAL.
(Application filed Sept. 18, 1895.)
(No Model.) 4 Sheets—Sheet 3.
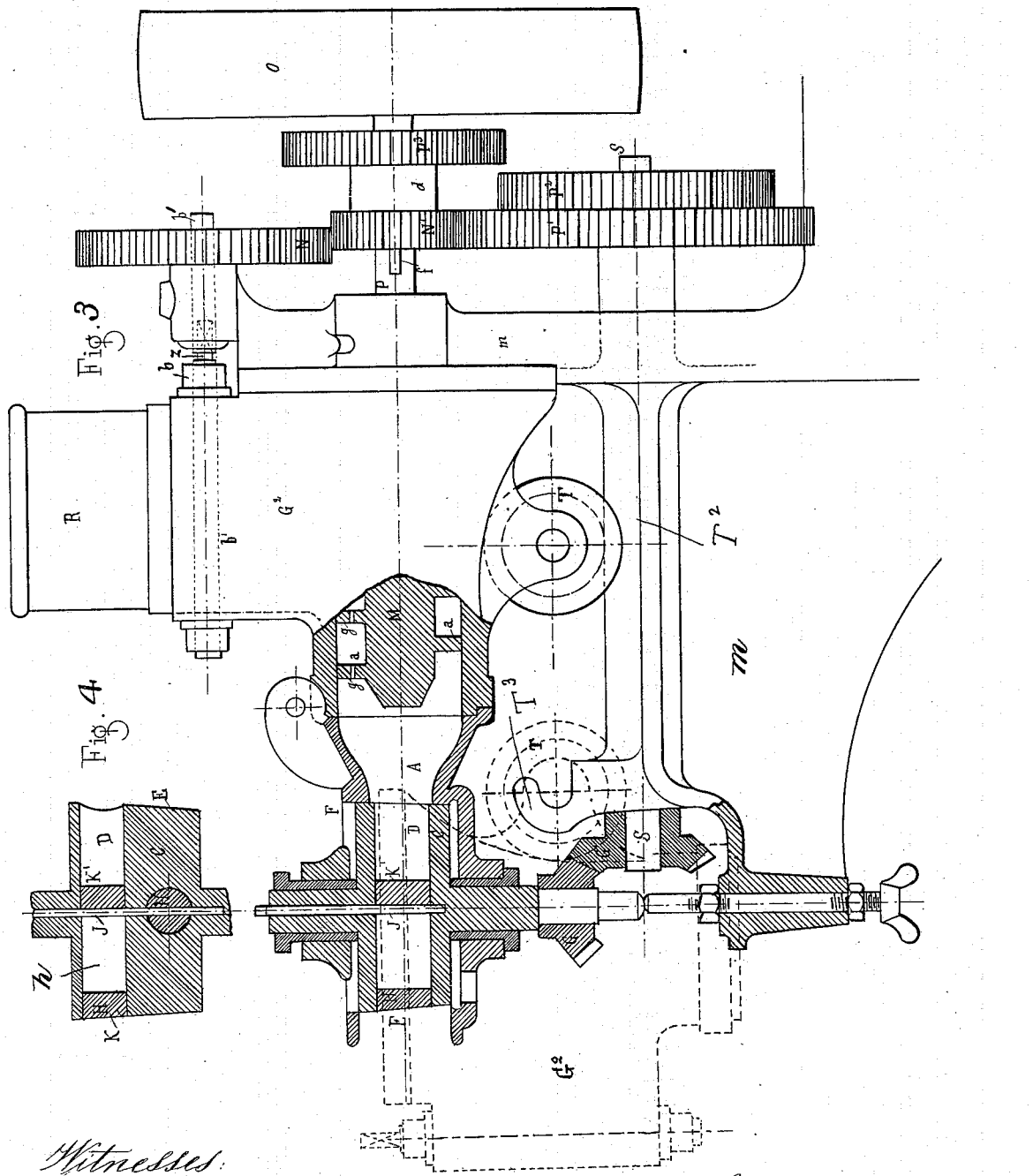

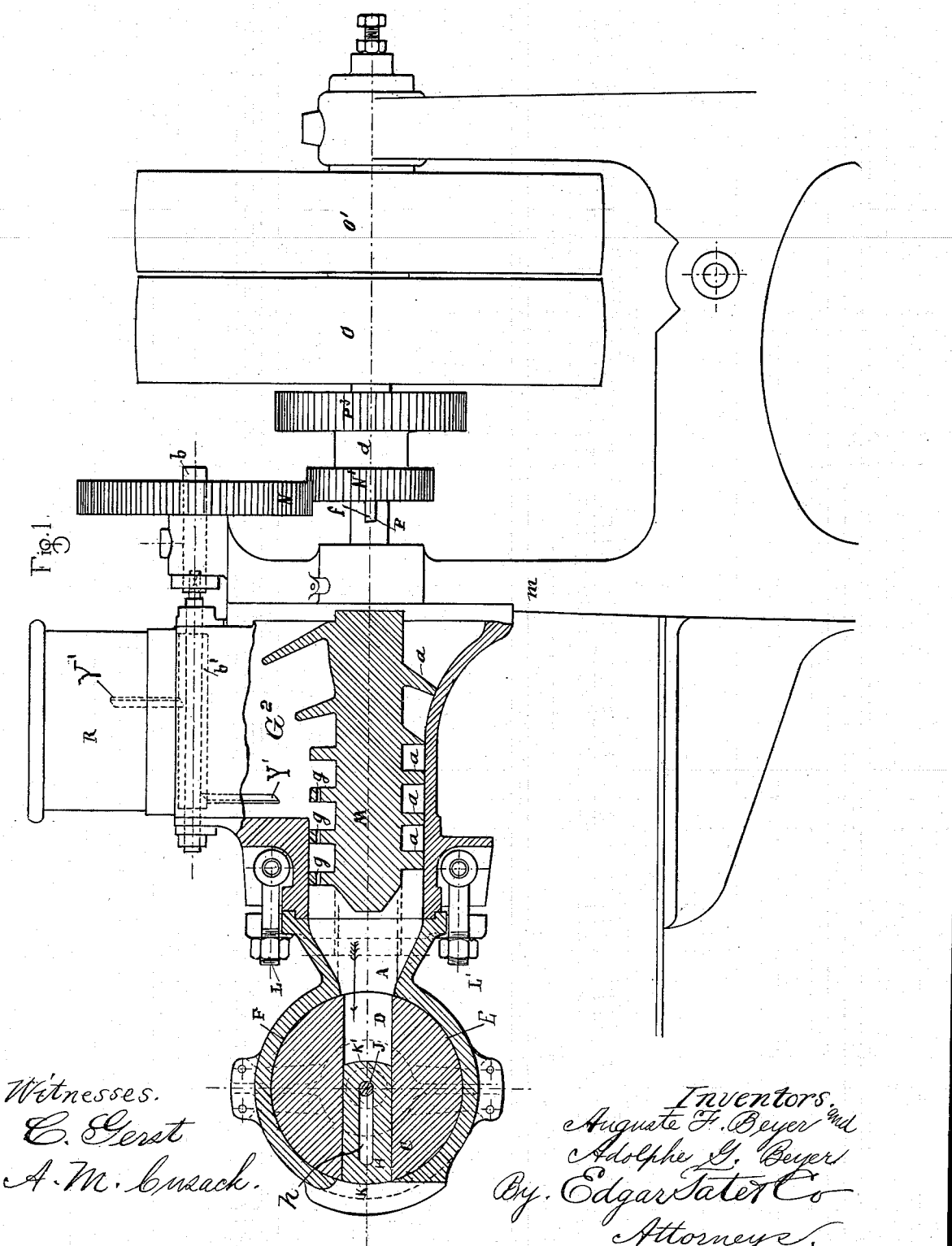

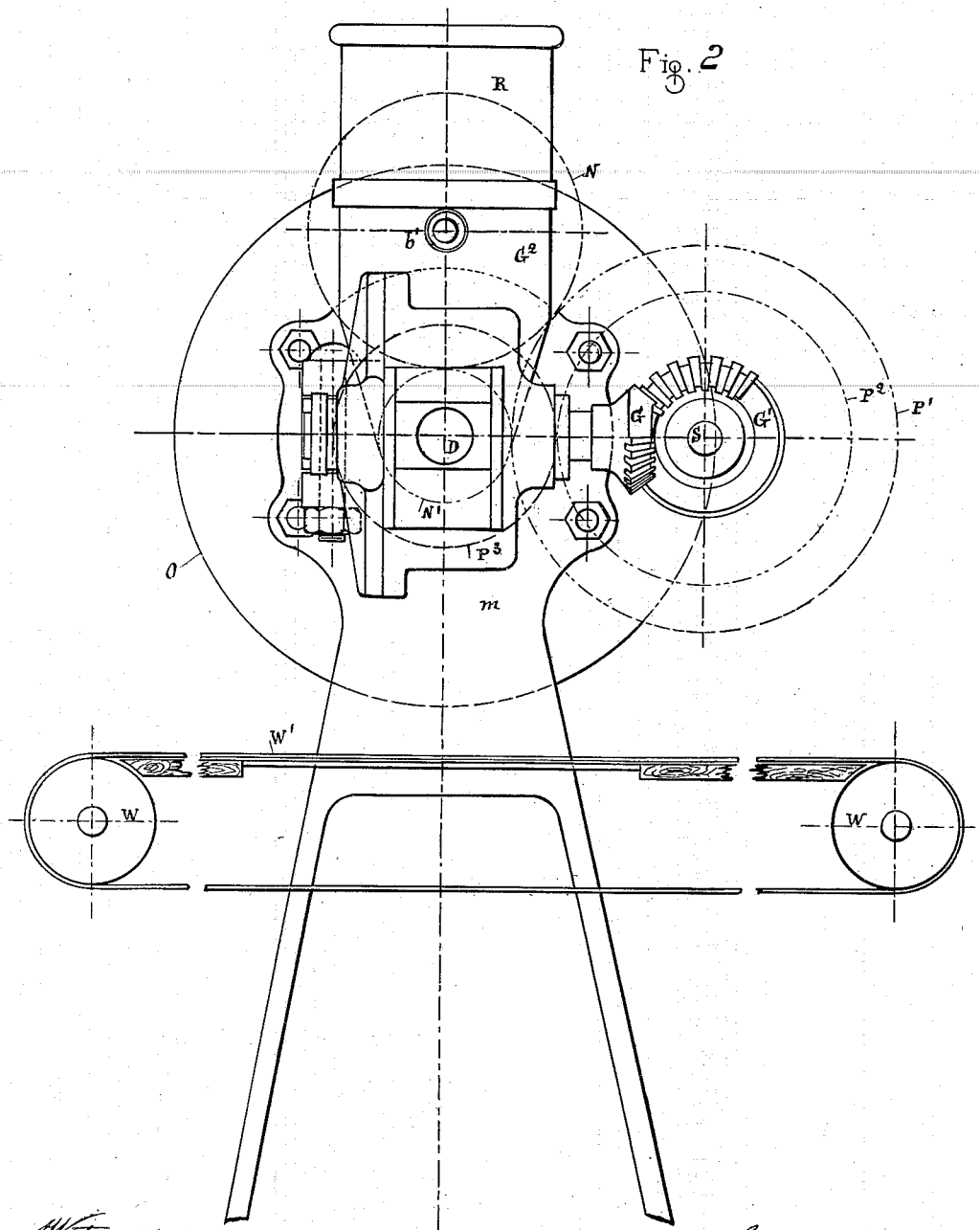

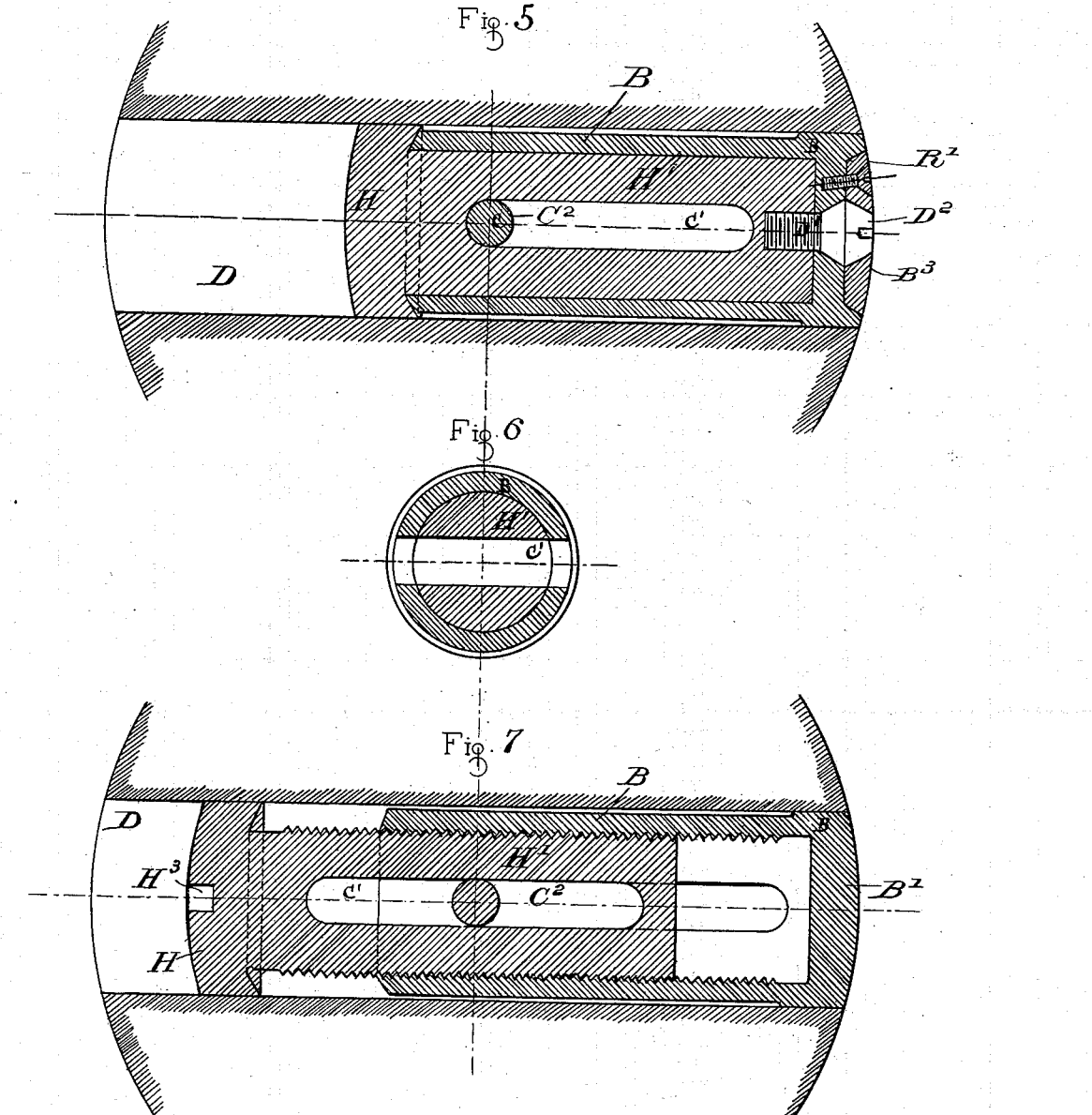

United States Patent Office.

AUGUSTE FREDERIC BEYER AND ADOLPHE GUSTAVE BEYER, OF PARIS, FRANCE.

APPARATUS FOR MOLDING SOAP OR OTHER MATERIAL.

SPECIFICATION forming part of Letters Patent No. 615,421, dated December 6, 1898.

Application filed September 18, 1895. Serial No. 562,914. (No model.)

*To all whom it may concern:*

Be it known that we, AUGUSTE FREDERIC BEYER and ADOLPHE GUSTAVE BEYER, citizens of the French Republic, and residents of 18 Rue de Lorraine, Paris, France, have invented certain new and useful Improvements in Automatic Molding-Machines for Soap, Chocolate, and the Like, (patented in France September 26, 1893, No. 233,058,) of which the following is a specification, reference being had to the accompanying drawings, forming a part thereof, in which similar letters of reference indicate corresponding parts.

This invention relates to machines for molding soap, chocolate, and similar material into cakes or other desired forms, the object being to provide a machine of the kind which will be automatic in its operation, simple in its mechanism, and economical to manufacture.

The invention consists of a machine for molding soap, chocolate, and other similar material into cakes or other desired forms constructed substantially as hereinafter described, and defined in the claims.

The invention is fully disclosed in the following specification, of which the accompanying drawings form a part, in which the separate parts of my improvement are designated by the same letters of reference in each of the views, and in which—

Figure 1 is a front elevation, partly in section, of a machine constructed in accordance with this invention. Fig. 2 is an end view thereof. Fig. 3 is a side view, partly in section, of a slightly-modified form of machine. Fig. 4 is a sectional view of a vertically-revoluble mold-cylinder provided with two pistons; and Figs. 5, 6, and 7 represent sectional views of modified forms of pistons, showing also the pistons in different positions.

Referring particularly to Figs. 1 and 3 of the drawings, A represents the mold, which is detachably connected with the casing of the feed-chamber $G^2$, and within said mold A is formed a circular chamber within which is arranged a disk C, adapted to be intermittently rotated therein. The disk C is provided with one or more transverse passages D, extending centrally therethrough, and the perimeter of the disk is turned and adjusted to fit the inner face F of its casing. A piston H is arranged within the transverse passage D and is adapted to be reciprocated therein. A central longitudinal slot $h$ is formed in said piston H, within which is arranged a pin J, which limits the movement of the piston H, said pin J passing through the axis of the disk C.

The intermittent rotation of the disk C is effected by means of a mutilated gear-wheel G, fixed upon the shaft of the said disk and in mesh with a mutilated gear-wheel G', fixed upon the shaft S, as shown in Fig. 3. The arrangement of the gears is such that the rotation of the disk C is interrupted at the moment the passage D is in alinement with the opening of the mold A to permit the introduction of the material to be molded. The material pressing against the head of the piston forces the same along the passage D until the pin J arrives at the end of the slot $h$, and the material is then compressed and assumes the shape of the chamber formed by the walls of said passage and the heads of the piston and receives the impress of a stamp which may be formed upon the heads K or K' of the piston. The disk then resumes its interrupted rotation until the other end of the passage D is in alinement with the opening of the mold, when its further rotation is again interrupted and the material is again forced into the passage, and pressing against the head of the piston forces it to the limit of its movement, whereby the compressed material is forced out the other end of the passage and falls upon a suitable receiver. This operation is repeated during the operation of the machine.

In Fig. 4 is shown a disk provided with two passages D, which are formed at right angles to each other and each of which is provided with a piston, and it will be understood that any desired number of such passages may be provided, the gears being correspondingly altered to interrupt the rotation of the disk at the proper time.

The form and size of the passage D may be varied, thus correspondingly varying the shape and size of the article, and as these conditions remain constant it is evident that each cake or article will be of the same size, weight, and shape.

The material to be worked is introduced into the feeding-chamber $G^2$ through the hopper R, in the bottom of which is arranged a transverse shaft $b'$, which is provided with a plurality of blades $y'$, whereby the material is passed into the said feeding-chamber. A feed-shaft M is arranged in said chamber, and the forward end thereof extends into the mold A. A flange $a$ is helically coiled about said shaft M, whereby the material is fed into the mold. The convolutions of the flange $a$ are substantially vertical at the end of the shaft adjacent to the mold, but gradually change to an inclined portion toward the other end, and the space between the different convolutions increases in a similar manner. By this construction the material is at first forced rapidly toward the mold and is gradually compressed as it approaches the mold, as will be readily understood.

The shaft S, which carries the gear-wheel $G'$, is provided with two gear-wheels $P'$ $P^2$. The feed-shaft M is also provided with a gear-wheel $N'$, which is arranged so as to be thrown into and out of mesh with the gear $P'$. On the same shaft is arranged a gear $P^3$, separated a suitable distance from the gear $N'$ and of a different diameter, which is adapted to be thrown into and out of mesh with the gear $P^2$, whereby an increased or diminished speed may be imparted to the shaft S, according as the gear $N'$ or $P^3$ is in mesh with their respective gears. The gears $N'$ and $P^3$ are preferably connected by a collar $d$, which is splined at $f$ on the end $p$ of the shaft M. Upon the end of shaft $b'$ is fixed a gear-wheel N, which is continuously in mesh with gear $N'$, whether the latter is in mesh with gear $P'$ or not, so as to provide for the rotation of the shaft $b'$ during the rotation of the feed-shaft M. A fast and loose pulley O $O'$ are arranged upon the outer end of the feed-shaft M for a power-belt.

Whenever it is desired to change or examine the disk C or to clean the same, the screws L $L'$ (shown in Fig. 1) may be loosened and the parts separated, as will be readily understood, and the disk-casing may be removed from the casing of the feed-chamber $G^2$. So, also, the hopper R may be removed by removing the nut $b$ and uncoupling the shaft $b'$ at Z.

The lower portion of the casing of the feed-chamber $G^2$ is provided with rollers T, mounted upon a track $T^2$, formed upon the underlying portion of the frame $m$. The outer end of this track is provided with an upwardly-extending lug formed into a hook $T^3$ at the upper end thereof.

When the disk-casing in the reservoir has been removed, the casing of the feed-chamber $G^2$ may be moved away from the frame $m$ and tilted over into the position shown in dotted lines in Fig. 3, said dotted lines representing the tilted casing with the hopper R removed, the axle of the rollers T in this operation engaging the hook-shaped lug $T^3$ and preventing said casing from falling. The feed-shaft M is thus removed from the feed-chamber $G^2$ and remains fixed to the frame $m$, and in this position access may be had to the interior of the feed-casing and also to the shaft M for cleaning and repairing.

The convolutions of the flange $a$ are provided with small perforations $g$, affording an escape for the material and preventing the material from being crowded too forcibly against the disk C and from creating too great a resistance.

An endless apron $W'$ is mounted upon drums W, as shown in Fig. 2, and is arranged to receive the molded cakes as they are fed or discharged from the disk C and by which they may be conveyed to any desired point.

In Fig. 5 is shown a modified form of piston H, which is constructed with a head the diameter of which is equal to the diameter of the passage D. A body portion $H'$ is formed integral with said head and projects into a tubular counter-piston B. A longitudinal slot $C'$ is formed in the body portion $H'$ and the counter-piston B, which is engaged by a pin $C^2$, by means of which the forward and backward movement of the piston H is regulated. The outer end of the counter-piston B is perforated for the reception of a bolt $D'$, which is threaded at its inner end and engages a threaded opening in the body portion $H'$ of the piston H. The head $D^2$ of said bolt is shaped substantially in the form of a double cone, and a washer $B^3$, having a central opening corresponding in shape with the outer portion of said bolt-head $D^2$, is countersunk within the head of the counter-piston B and secured thereto by suitable screws $R'$. From this construction it will be readily seen that the piston H may be adjusted with respect to the counter-piston B by turning the screw $B'$ with a suitable tool applied to the head $D^2$. By increasing or diminishing the length of the piston H it is evident that the size or thickness of the molded article may be correspondingly changed.

In Fig. 7 is represented another modification in the means by which the length of the piston H may be varied. The body portion $H'$ of the piston H is screw-threaded and is adapted to be screwed into the threaded tubular opening of the counter-piston B. By removing the pin $C^2$ the said parts may be suitably adjusted and the pin replaced. In this form the head $B'$ of the counter-piston B is equal in diameter to the diameter of the passage D.

Having fully described our invention, we claim as new and desire to secure by Letters Patent—

1. In a machine for molding cakes of soap and other articles, the combination with a suitable frame, of a horizontal casing provided with a feed-chamber, a hopper mounted over said chamber, a circular mold-chamber communicating with the outer end of the feed-chamber, a feed-shaft mounted in said feed-chamber, and projecting approximately to the mold-chamber, an intermittently-rotatable disk mounted in the mold-chamber and provided with a transverse passage, each end of which is adapted to be brought into communication with the mouth of the feed-chamber, and a longitudinally-movable piston mounted in said passage, said feed-shaft being provided with a spiral flange, and means for rotating said disk and for operating the feed-shaft, substantially as described.

2. In a machine for the purpose herein described, the combination with a suitable frame, of a casing removably connected therewith, and provided with a feed-chamber, a feed-shaft mounted in said frame and projecting through said chamber and provided with a spiral flange, a mold-chamber connected with said feed-chamber, an intermittently-rotatable disk mounted in said mold-chamber, and provided with a transverse passage, the opposite ends of which are adapted to register with the mouth of the mold-chamber, a movable piston mounted in said passage, and means for operating said disk and said feed-shaft, substantially as described.

3. In a machine for molding cakes of soap and other articles, the combination with a suitable frame, of a casing provided with a feed-chamber and a mold-chamber communicating therewith, a feed-shaft arranged in said feed-chamber and projecting into said mold-chamber, a disk-casing secured to the main casing, a disk rotatably sleeved in said casing and provided with a central transverse passage, a movable piston arranged in said passage having a pin-and-slot connection with said disk whereby the movement of said piston is limited, means for intermittently rotating the said disk and means for rotating said feed-shaft, substantially as described.

4. In a machine for molding cakes of soap and other articles, the combination with a suitable frame of a main casing removably secured thereto, rollers journaled in the under side of said casing, a track formed upon said frame upon which said rollers operate, a vertical hook-lug arranged at the end of said track and adapted to engage the axle of said rollers, and a feed-shaft journaled in said frame and projecting into said main casing, substantially as described.

5. In a machine for molding cakes of soap and other articles, the combination with a suitable frame, of a casing provided with a feed-chamber and a mold-chamber communicating therewith, a feed-shaft arranged in said feed-chamber and projecting into said mold-chamber, a disk rotatably mounted in said casing and provided with a transverse passage, a piston movable in said passage and constructed of two adjustable portions, means for locking the said portions in their adjusted position, a pin arranged in said disk and adapted to engage a longitudinal slot in said piston, the relation of the pin and slot being such as to limit the movement of said piston when either face thereof is flush with said disk, substantially as described.

In witness whereof we have signed this specification in presence of two witnesses.

AUGUSTE FREDERIC BEYER.
ADOLPHE GUSTAVE BEYER.

Witnesses:
E. A. CARON,
H. DROUILLOT.